United States Patent Office 2,891,968
Patented June 23, 1959

2,891,968

DIFLUOROBUTENEDIOIC ACIDS, THEIR ALKALI METAL SALTS, THEIR ALKYL ESTERS AND ANHYDRIDE, AND PROCESS FOR PREPARING THEM

Maynard S. Raasch, Wilmington, Del., assignor to E. I. du Pont de Nemours & Company, Wilmington, Del., a corporation of Delaware No Drawing. Application August 12, 1955
Serial No. 528,114

12 Claims. (Cl. 260—346.8)

This invention relates to new organic compounds containing fluorine and methods for their preparation. More particularly, this invention relates to new organic fluorine-containing dicarboxylic acid compounds and to methods for their preparation.

In the chemotherapy of fungus diseases, active compounds are desired which have maximum toxicity to the fungus and minimum toxicity to the host. Many chemical compounds possess one or the other of these properties separately. However, those materials which possess these properties in combination are not predictable on the basis of chemical constitution and must be found by search and testing.

It is an object of this invention to provide new organic compounds containing fluorine and methods for their preparation. A further object is to provide new organic fluorine-containing dicarboxylic acids, their salts, esters and anhydride thereof, and methods for their preparation. Another object is to provide a new group of fungicides. Other objects will appear hereinafter.

These and other objects of this invention are accomplished by providing the difluorobutenedioic acids, their salts, esters and anhydride thereof. The difluorobutenedioic acids exist in two isomeric forms, the cis-difluorobutenedioic acid or difluoromaleic acid and the trans-difluorobutenedioic acid or difluorofumaric acid. These two isomeric difluorobutenedioic acids are represented by the following formulas:

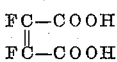 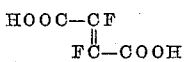

Cis-difluorobutenedioic acid    Trans-difluorobutenedioic acid
Difluoromaleic acid            Difluorofumaric acid The anhydride and esters of the difluorobutenedioic acids have utility as monomers for copolymerization with styrene.

This invention also includes the process for preparing the difluorobutenedioic acids which comprises heating trifluorosuccinic acid in strong alkali, acidifying the reaction mixture and separating the difluorobutenedioic acids as the resulting products. Difluorobutenedioic acid anhydride, i.e., difluoromaleic anhydride, is obtained by treating difluoromaleic acid with a strong dehydrating agent and recovering difluoromaleic anhydride from the reaction mixture by distillation.

The synthesis of the difluorobutenedioic acids and the anhydride thereof is illustrated as follows:

Trifluorosuccinic acid is dehydrofluorinated by heating in strong aqueous alkali to obtain a solution of a mixture of the alkali metal salts of difluorofumaric and difluoromaleic acids. This mixture is acidified to obtain a mixture of difluorofumaric and difluoromaleic acids, from which difluorofumaric acid is separated by recrystallization from water. As an alternative procedure, the mixture can be converted to difluoromaleic anhydride with phosphorus pentoxide and the anhydride can be hydrolyzed to difluoromaleic acid.

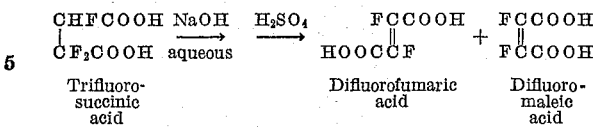

Trifluoro-      Difluorofumaric     Difluoro-
succinic            acid              maleic
acid                                          acid When the medium for dehydrofluorination of trifluorosuccinic acid is an anhydrous alcohol instead of water, difluoromaleic acid predominates in the product, and only a small amount of difluorofumaric acid is obtained. Thus, this invention also includes the process of heating trifluorosuccinic acid in strong alcoholic alkali, acidifying the reaction mixture and separating difluoromaleic acid as the resulting product.

Trifluorosuccinic acid is dehydrofluorinated by heating in strong alcoholic alkali to obtain a solution of the alkali salt of difluoromaleic acid. This solution is acidified to obtain difluoromaleic acid.

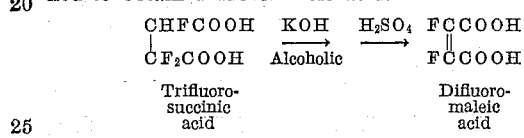

Trifluoro-                        Difluoro-
succinic                       maleic
acid                              acid Difluoromaleic acid is treated with a strong dehydrating agent to obtain difluoromaleic anhydride which is recovered from the mixture by distillation.

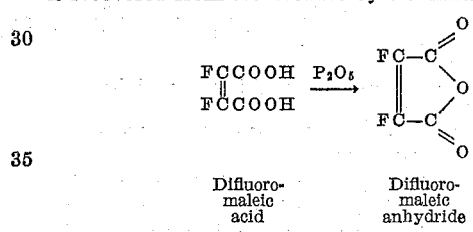

Difluoro-          Difluoro-
maleic            maleic
acid              anhydride This synthesis of the difluorobutenedioic acids also involves the preparation of trifluorosuccinic acid which comprises contacting and dechlorinating chlorotrifluorosuccinic acid with metallic zinc and then acidifying to obtain the trifluorosuccinic acid. This synthesis of trifluorosuccinic acid from chlorotrifluorosuccinic acid is illustrated as follows:

Chlorotrifluorosuccinic acid is dechlorinated by the action of metallic zinc and then acidified to obtain trifluorosuccinic acid.

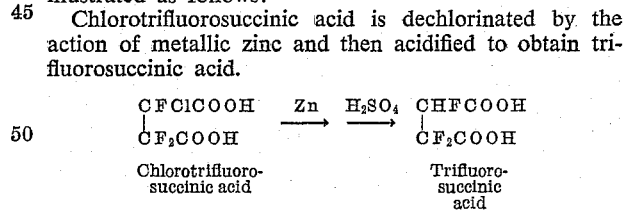

Chlorotrifluoro-           Trifluoro-
succinic acid               succinic
                                      acid The synthesis of the difluorobutenedioic acids and the anhydride thereof is illustrated specifically in the following examples in which parts are by weight.

EXAMPLE I

*Preparation of difluorofumaric and difluoromaleic acids*

A solution comprised of 1000 parts of water, 344 parts of trifluorosuccinic acid and 240 parts of sodium hydroxide is heated at 100° C. for 15 hours. The solution is cooled, acidified with a mixture of 500 parts of water and 1472 parts of concentrated sulfuric acid, and extracted with ether. Evaporation of the ether gives 302 parts (99% yield) of a mixture of difluorofumaric and difluoromaleic acids. Recrystallization from water gives 105 parts (34% yield) of difluorofumaric acid, M.P. 268–270° C. (Fisher-Johns melting point apparatus).

Analysis.—Calcd. for $C_4H_2F_2O_4$: C, 31.59; H, 1.33; F, 24.99. Found: C, 32.03; H, 1.61; F, 24.18.

When difluorofumaric acid is heated with phosphorus pentoxide, it is converted to difluoromaleic anhydride.

EXAMPLE II

Part A.—Preparation of difluoromaleic acid

To 198 parts of 85% potassium hydroxide in 1580 parts of absolute ethanol is added 216 parts of trifluorosuccinic acid/dioxane complex. The mixture is stirred and refluxed for five hours, then cooled and the solid is filtered off. The solid is dissolved in 500 parts of water, decolorized with charcoal, and acidified with 150 parts of 37% aqueous hydrochloric acid. Potassium acid difluoromaleate precipitates and is filtered off; yield, 104 parts or 55% of theory. This salt is stirred with 500 parts of 50% sulfuric acid and extracted with ether to give 84 parts of difluoromaleic acid (99% recovery from the salt). After recrystallization from acetone-benzene, the acid melts at 219–220° C.

Analysis.—Calcd. for $C_4H_2F_2O_4$: C, 31.59; H, 1.33; F, 24.99. Found: C, 31.49; H, 1.68; F, 24.81.

The acid may also be purified through its anhydride to insure absence of difluorofumaric acid.

The mother liquor from which the potassium acid difluoromaleate is filtered contains a small amount of difluorofumaric acid.

Part B.—Preparation of difluoromaleic anhydride

Difluoromaleic acid (75 parts) and 75 parts of phosphorus pentoxide are heated in a still and difluoromaleic anhydride distills over. This is redistilled through a column to give 58.5 parts of difluoromaleic anhydride (89% yield) boiling at 128° C., $n_D^{25}$ 1.4179, M.P. 20° C.

Analysis.—Calcd. for $C_4F_2O_3$: C, 35.84; F, 28.36. Found: C, 35.63; F, 28.34.

Difluorofumaric acid may be used in place of difluoromaleic acid in Part B above.

Hydrolysis of difluoromaleic anhydride with water produces difluoromaleic acid.

The trifluorosuccinic acid employed in the preparation of the difluorobutenedioic acids is prepared as follows:

To 332 parts of chlorotrifluorosuccinic acid in 725 parts of dioxane is added in portions with stirring 121 parts of 95% zinc dust. The temperature is kept at 40–50° C. by external cooling. After all the zinc has been added, the mixture is stirred for 15 hours longer. The solution is decanted and the dioxane is evaporated off. After dissolving the residue in water and adding 188 parts of concentrated sulfuric acid, the trifluorosuccinic acid is extracted with ether. The ether solution is dried over magnesium sulfate and evaporated to dryness. The crystals so obtained are washed with methylene chloride. The yield of product is 236 parts or 68% of theory. After crystallization from ether-chloroform, it melts at 95–96° C. The product is an association compound of two molecules of trifluorosuccinic acid with one of dioxane.

Analysis.—Calcd. for $(C_4H_3F_3O_4)_2 \cdot C_4H_8O_2$: C, 33.35; H, 3.26; F, 26.37. Found: C, 33.35, 33.01; H, 3.23, 3.29; F, 25.77.

The acid is freed of dioxane by crystallization of its dianilinium salt from ethanol-water. The trifluorosuccinic acid is recovered from the salt by acidification with hydrochloric acid and extraction with ether. After recrystallization from trifluoroacetic acid-benzene it melts at 111–112° C.

Analysis.—Calcd. for $C_4H_3F_3O_4$: C, 27.92; H, 1.76; F, 33.13. Found: C, 28.09; H, 1.90; F, 34.51.

The starting material chlorotrifluorosuccinic acid employed in the preparation of trifluorosuccinic acid can be prepared from vinylidene chloride and chlorotrifluoroethylene by the following steps:

Step 1.—Chlorotrifluoroethylene and vinylidene chloride are reacted in the presence of a polymerization inhibitor under heat and pressure to obtain 1,1,2-trichloro-2,3,3-trifluorocyclobutane.

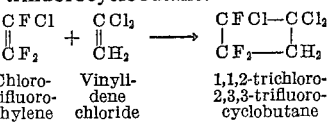

Step 2.—1,1,2-trichloro-2,3,3-trifluorocyclobutane is treated with triethylamine to obtain 1,4-dichloro-3,3,4-trifluorocyclobutene.

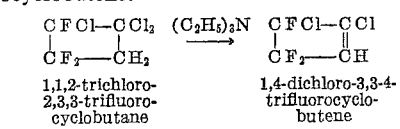

Step 3.—1,4-dichloro-3,3,4-trifluorocyclobutene is oxidized with an aqueous alkali solution of potassium permanganate. The resulting mixture is acidified to obtain chlorotrifluorosuccinic acid.

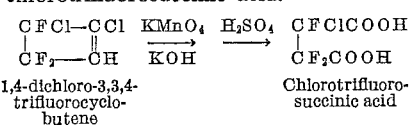

These steps for the preparation of chlorotrifluorosuccinic acid are carried out as follows:

STEP 1.—1,1,2-TRICHLORO-2,3,3-TRIFLUOROCYCLOBUTANE FROM CHLOROTRIFLUOROETHYLENE AND VINYLIDENE CHLORIDE

A stainless steel bomb is charged with 350 parts of vinylidene chloride, 1 part of hydroquinone, and 300 parts of chlorotrifluoroethylene. The mixture is heated at 180° C. for 10 hours under autogenous pressure. The product is filtered from polymer and then distilled to give 266 parts (48% yield) of 1,1,2-trichloro-2,3,3-trifluorocyclobutane boiling at 120–121° C., $n_D^{25}$ 1.4139.

Analysis.—Calcd. for $C_4H_2Cl_3F_3$: C, 22.51; H, 0.95; Cl, 49.85. Found: C, 22.61; H, 1.09; Cl, 49.32.

STEP 2.—1,4-DICHLORO-3,3,4-TRIFLUOROCYCLOBUTENE FROM 1,1,2-TRICHLORO-2,3,3-TRIFLUOROCYCLOBUTANE

In a glass reactor fitted with stirrer, reflux condenser, and addition funnel are placed 555 parts of 1,1,2-trichloro-2,3,3-trifluorocyclobutane and 607 parts of anhydrous ether. Triethylamine (289 parts) is added slowly, and the mixture is allowed to stand for 20 hours. Then 1200 parts of water plus 90 parts of 37% aqueous hydrochloric acid is added to dissolve the triethylamine hydrochloride and excess triethylamine. After stirring thoroughly, the organic layer is separated and washed with water. After being dried over magnesium sulfate, the ether solution is distilled to give 400 parts (87% yield) of 1,4-dichloro-3,3,4-trifluorocyclobutene, B.P. 91–92° C., $n_D^{25}$ 1.3942.

Analysis.—Calcd. for $C_4HCl_2F_3$: Cl, 40.07. Found: Cl, 39.96.

STEP 3.—CHLOROTRIFLUOROSUCCINIC ACID FROM 1,4-DICHLORO-3,3,4-TRIFLUOROCYCLOBUTENE

In a glass reactor fitted with stirrer, thermometer, addition funnel, and cooled in an ice-salt bath are placed 4000 parts of water, 153 parts of potassium hydroxide, and 718 parts of potassium permanganate. During 2.5 hours there is added 410 parts of 1,4-dichloro-3,3,4-trifluorocyclobutene at 15–20° C. The mixture is then allowed to stir 10 hours longer at room temperature and then filtered from manganese dioxide. The volume of the filtrate is reduced to about one-third the original volume by heating on a steam bath. After cooling and adding 543 parts of concentrated sulfuric acid, the solution is extracted with ether. The ether is dried briefly with magnesium sulfate and then distilled off. The chlorotrifluorosuccinic acid thus obtained is taken up in methylene chloride. Part of the product crystallizes out and is filtered off and washed with methylene chloride. By judiciously adding a small amount of water to the filtrate, more crystalline product is obtained. A total of 409 parts (84% yield) of white, very hygroscopic, crystalline chlorotrifluorosuccinic acid is obtained. After drying over phosphorus pentoxide it melts at 55° C.

*Analysis.*—Calcd. for $C_4H_2ClF_3O_4$: Cl, 17.17. Found: Cl, 16.77.

The dipotassium salt is prepared and crystallized from ethanol-water.

*Analysis.*—Calcd. for $C_4ClF_3K_2O_4$: Cl, 12.54. Found: Cl, 12.52.

In the process of preparing the difluorobutenedioic acids by the action of strong alkali on trifluorosuccinic acid or on a complex of trifluorosuccinic acid with dioxane, any strong alkali may be employed. The alkali metal hydroxides are preferred for this purpose, particularly sodium hydroxide and potassium hydroxide. While the use of a solvent is not essential, it is preferable to work in solution, particularly in water for preparing difluorofumaric acid and in alcohol for preparing difluoromaleic acid. Elevated temperatures are preferred in the range of 50–150° C. Difluorofumaric acid is recovered from the aqueous reaction mixture and difluoromaleic acid from the alcoholic reaction mixture by acidifying and taking up the free acid in a water-immiscible organic solvent.

Difluorofumaric acid, prepared according to this invention in aqueous solution, is always obtained first as a mixture with at least some difluoromaleic acid. The two acids are readily separated by recrystallization, preferably in water.

For use in biological processes, difluorofumaric and difluoromaleic acids can be employed in the form of their equivalent derivatives, such as their salts and esters. Metal salts of these difluorobutenedioic acids are readily formed by reaction of an aqueous solution of the free acid with a metal oxide, hydroxide or carbonate at 20° C. to 100° C.

Esters are prepared by refluxing a mixture of difluorofumaric or difluoromaleic acid and an alcohol, i.e., an alkanol, particularly of 1 to 8 or more carbon atoms such as methanol, ethanol, butanol, octanol and the like, in the presence of a trace of mineral acid. The esters of difluorofumaric and difluoromaleic acids, such as the dialkyl esters, for example, the dimethyl-, the diethyl-, and the dioctyl-difluorofumarates and difluoromaleates, are thus readily prepared. Monoesters are made by reacting difluoromaleic anhydride with alcohols.

The anhydride and esters of the difluorobutenedioic acids, particularly dimethyl difluorofumarate, dimethyl difluoromaleate, diethyl difluorofumarate and diethyl difluoromaleate, are useful for preparing novel copolymers with styrene.

Such copolymers and their uses are illustrated by the preparation of diethyl difluorofumarate/styrene copolymers as follows:

In a glass reactor a mixture of 50 parts of diethyl difluorofumarate, 150 parts of styrene and 5 parts of α,α'-azobisisobutyronitrile is heated at 100° C. for 16 hours. This treatment converts the mixture to a solid block of transparent, colorless copolymer. The copolymer is dissolved in benzene and reprecipitated by drowning in methanol. The dried copolymer is useful as a thermoplastic molding powder for the production of rigid-shaped articles, such as knife handles and the like. Fluorine analysis of the copolymer shows 4.74% fluorine as compared to 4.45% calculated for the original reaction mixture.

In a similar manner a mixture of 60 parts of diethyl difluorofumarate, 50 parts of styrene and 5 parts of benzoyl peroxide is heated at 100° C. for 16 hours to obtain a solid block of transparent, colorless copolymer. This copolymer is dissolved in benzene and reprecipitated by drowning in methanol. The resultant thermoplastic copolymer on analysis shows 9.95% fluorine compared to 10.3% fluorine calculated for the original reaction mixture.

The copolymerizability of difluoromaleic acid derivatives is illustrated by the copolymer of difluoromaleic anhydride and styrene as follows:

A solution of 6.7 parts of difluoromaleic anhydride, 5.2 parts of styrene and 0.05 part of benzoyl peroxide in 26 parts of xylene is heated at 100° C. for 16 hours. The difluoromaleic anhydride/styrene copolymer formed remains in solution and is isolated by pouring the solution into 260 parts of petroleum ether. The precipitated powder is filtered off and washed with petroleum ether. The yield is 4.6 parts. The copolymer softens at about 180° C., is completely soluble in aqueous alkali, and such a solution foams when shaken. The solubility of the copolymer in solvents such as xylene makes it feasible to include it as an ingredient in formulations for finishes. Maleic anhydride/styrene copolymer is not soluble in xylene.

When difluoromaleic anhydride in the above copolymerization is replaced by a molar equivalent of dichloromaleic anhydride, no material precipitated by petroleum ether is formed, and only a 9% yield of syrup is left after distilling off the monomeric materials under vacuum.

The products of the present invention are particularly useful as fungicides. This may be illustrated by the results of greenhouse tests with tomato plants performed as described by McCallan and Wellman (Crop Protection Digest, Bulletin 68, July 1943, pages 93–134).

In such a test one set of tomato plants is sprayed with a 0.0016% aqueous solution of difluoromaleic acid and another set is sprayed with a 0.2% aqueous solution of difluoromaleic acid. The treated plants, along with a corresponding group of untreated controls, are inoculated with tomato early blight (*Alternaria solani*). At a subsequent time when the control plants show 100% disease, the plants treated with 0.0016% difluoromaleic acid show 15% disease and those treated with 0.2% difluoromaleic acid show only 2% disease. Corresponding plants treated respectively with 0.0016% fluoromaleic acid and dichloromaleic acid show 61% and 65% disease.

In another such test one set of tomato plants is sprayed with a 0.0016% aqueous solution of difluorofumaric acid and another set is sprayed with a 0.2% aqueous solution of difluorofumaric acid. The treated plants, along with a corresponding group of untreated controls, are inoculated with tomato early blight (*Alternaria solani*). At a subsequent time when the control plants show 100% disease, the plants treated with 0.0016% difluorofumaric acid show 40% disease and those treated with 0.2% difluorofumaric acid show only 2% disease. Corresponding plants treated with 0.0016% fluorofumaric acid show 61% disease.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A fluorine-containing compound selected from the class consisting of difluorobutenedioic acids, their alkali metal salts, their alkyl esters with an alkanol of 1 to 8 carbon atoms, and anhydride thereof.

2. A dialkyl ester of a difluorobutenedioic acid with an alkanol of 1 to 8 carbon atoms.

3. Process for preparing difluoromaleic acid which comprises heating, at a temperature of 50 to 150° C., trifluorosuccinic acid in strong alcoholic sodium hydroxide, acidifying the reaction mixture with sulfuric acid and separating difluoromaleic acid as the resulting product.

4. Difluorofumaric acid.

5. Difluoromaleic acid.

6. Difluoromaleic anhydride.

7. Process for preparing a difluorobutenedioic acid which comprises heating, at a temperature of 50 to 150° C., trifluorosuccinic acid in strong alkali metal hydroxide, acidifying the reaction mixture and separating a difluorobutenedioic acid as the resulting product.

8. Process for preparing a difluorobutenedioic acid which comprises contacting and dechlorinating chlorotrifluorosuccinic acid with metallic zinc, acidifying the dechlorinated product and obtaining trifluorosuccinic acid, heating, at a temperature of 50 to 150° C., said trifluorosuccinic acid in strong alkali metal hydroxide, acidifying the reaction mixture and separating a difluorobutenedioic acid as the resulting product.

9. Process for preparing difluorofumaric acid which comprises heating, at a temperature of 50 to 150° C., trifluorosuccinic acid in strong aqueous alkali metal hydroxide, acidifying the reaction mixture and separating difluorofumaric acid as the resulting product.

10. Process for preparing difluoromaleic acid which comprises heating, at a temperature of 50 to 150° C., trifluorosuccinic acid in strong alcoholic alkali metal hydroxide, acidifying the reaction mixture and separating difluoromaleic acid as the resulting product.

11. Process for preparing difluoromaleic anhydride which comprises heating, at a temperature of 50 to 150° C., trifluorosuccinic acid in strong alkali metal hydroxide, acidifying the reaction mixture to obtain difluorobutenedioic acids, reacting said difluorobutenedioic acids with a strong dehydrating agent, and separating difluoromaleic anhydride as the resulting product.

12. Process for preparing difluoromaleic anhydride which comprises heating, at a temperature of 50 to 150° C., trifluorosuccinic acid in strong alcoholic alkali metal hydroxide, acidifying the reaction mixture to obtain difluoromaleic acid, reacting said difluoromaleic acid with phosphorus pentoxide, and separating difluoromaleic anhydride as the resulting product.

References Cited in the file of this patent

UNITED STATES PATENTS

| | | |
|---|---|---|
| 2,218,181 | Searle et al. | Oct. 15, 1940 |
| 2,306,351 | Brunson | Dec. 22, 1942 |
| 2,329,433 | Brunson | Sept. 14, 1943 |
| 2,426,224 | Kharasch | Aug. 26, 1947 |
| 2,599,123 | Pinkney et al. | June 3, 1952 |
| 2,667,505 | Ladd et al. | Jan. 26, 1954 |
| 2,702,306 | Gall | Feb. 15, 1955 |
| 2,717,247 | Contois | Sept. 6, 1955 |
| 2,782,218 | Drysdale | Feb. 19, 1957 |
| 2,824,888 | Raasch | Feb. 25, 1958 |
| 2,831,835 | Middleton | Apr. 22, 1958 |

OTHER REFERENCES

Beilstein: Vol. 17, p. 434 (mainwork), vol. 2, p. 743.